United States Patent

Pate et al.

[11] Patent Number: 5,927,970
[45] Date of Patent: Jul. 27, 1999

[54] APPARATUS FOR RECOVERING HYDROCARBONS FROM SOLIDS

[75] Inventors: Robin M. Pate; Jack Blonquist, both of Houston, Tex.; John Monnig; Gerardo Gamboa, both of Tulsa, Okla.

[73] Assignee: Onsite Technology, L.L.C., Houston, Tex.

[21] Appl. No.: 08/796,086

[22] Filed: Feb. 5, 1997

Related U.S. Application Data

[60] Provisional application No. 60/027,295, Oct. 2, 1996.

[51] Int. Cl.⁶ .................................................. F27B 7/24
[52] U.S. Cl. ........................ 432/115; 432/113; 47/1.42; 34/242
[58] Field of Search .................. 34/242; 47/1.42; 110/246; 432/105, 107, 113, 115

[56] References Cited

U.S. PATENT DOCUMENTS

| | | | |
|---|---|---|---|
| 3,451,781 | 6/1969 | Greene | 23/259.1 |
| 3,556,413 | 1/1971 | Lindgren | 239/658 |
| 3,923,097 | 12/1975 | Hovad | 165/92 |
| 4,052,151 | 10/1977 | Reichrt et al. | 432/115 |
| 4,140,478 | 2/1979 | Kawakami et al. | 432/113 |
| 4,337,583 | 7/1982 | Harris | 34/33 |
| 4,338,080 | 7/1982 | Grandcolas et al. | 34/242 |
| 4,457,520 | 7/1984 | Grachtrup | 432/115 |
| 4,535,550 | 8/1985 | Walter | 34/33 |
| 4,576,572 | 3/1986 | Mueller et al. | 432/105 |
| 4,730,564 | 3/1988 | Abboud | 110/246 |
| 5,152,233 | 10/1992 | Spisak | 110/240 |
| 5,199,354 | 4/1993 | Wood | 110/241 |
| 5,302,118 | 4/1994 | Renegar et al. | 432/14 |
| 5,378,059 | 1/1995 | Brock | 366/7 |
| 5,383,672 | 1/1995 | Cornelius | 432/115 |
| 5,388,985 | 2/1995 | Musil et al. | 431/116 |
| 5,403,085 | 4/1995 | Banks | 366/23 |
| 5,480,226 | 1/1996 | Milstead | 366/7 |
| 5,499,586 | 3/1996 | Davis | 110/246 |
| 5,551,870 | 9/1996 | Gale | 34/242 |
| 5,570,749 | 11/1996 | Reed | 175/66 |

*Primary Examiner*—Teresa J. Walberg
*Assistant Examiner*—Gregory A. Wilson
*Attorney, Agent, or Firm*—Kenneth H. Johnson

[57] ABSTRACT

An apparatus is provided which is a trailer mounted rotating drum having an auger feed, an air tight seal, chain, and spiral and lateral flights within the drum which is heated externally, through which contaminated soil, such as drilling cuttings, is heated and processed to remove and reclaim the contaminants. The decontaminated soil exits through a dual trap door arrangement with the entry and exit door being 180° apart. A water quench line extends into the drum for dust suppression. The contaminant is typically diesel oil which has been added to drilling muds. The soil which exits the unit is essentially contaminant free, and the diesel oil which has been vaporized during the heating process is condensed and collected.

66 Claims, 8 Drawing Sheets

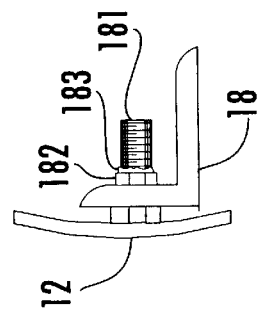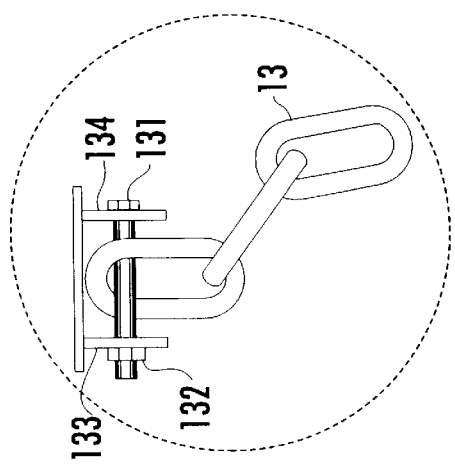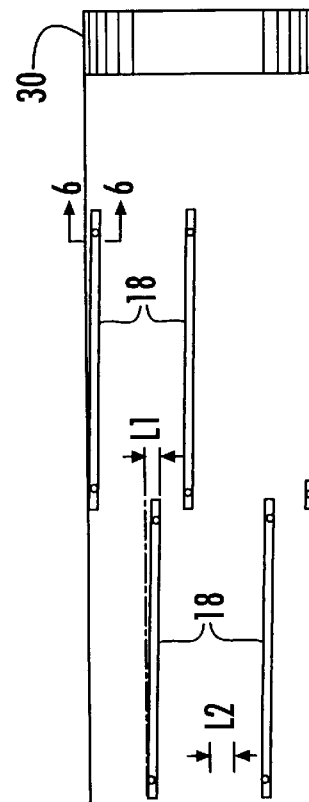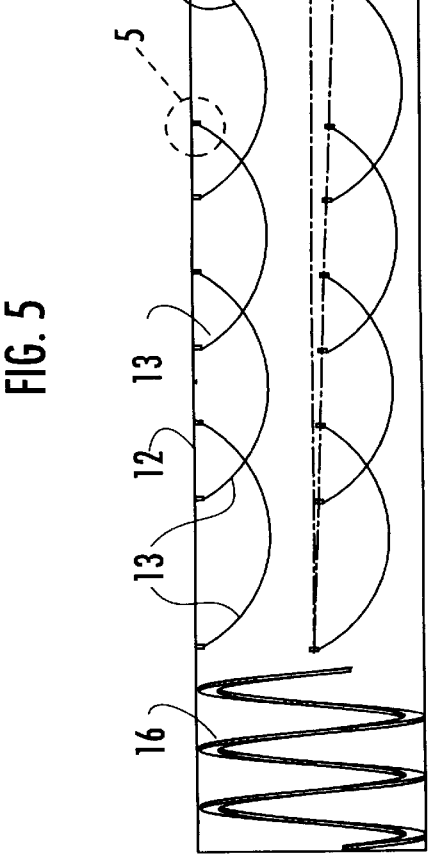

APPARATUS FOR RECOVERING HYDROCARBONS FROM SOLIDS

Priority is claimed for this application under 35 USC § 119 (e) from provisional application Serial No. 60/027,295 filed Oct. 2, 1996.

BACKGROUND OF THE INVENTION

1. Field of the Invention

The present invention relates to an apparatus for removing volatile material from solids. More particularly, the invention relates to an apparatus for removing hydrocarbons from earth, dirt, clay, drilling mud and the like. More particularly the invention relates to an apparatus including a heated rotary kiln having special sealing means for the shaft, solids removal apparatus and unique firing arrangement.

2. Related Information

Due to environmental concerns the removal of volatile material from solids has become an important process. The removal of hydrocarbons which have soaked into the ground over a period of time is now known as "remediation" and the number of recognized sites has grown astronomically. Former refinery and chemical manufacturing and storage facilities are prime candidates. Even the simple corner where a gasoline service station once stood is a candidate for "remediation". Other locations where remediation may be desirable or required are clothes cleaners, storage yards, junk yards, auto race tracks, auto repair shops and garbage dumps. Typically the soil is removed and taken to a remote location for storage until the volatile materials have dissipated into the atmosphere.

Another area in which volatile materials must be removed from solids is the reclamation of petroleum lubricated drilling fluids used in the exploration and production of petroleum oils. The drilling fluid, referred to as "mud", serves several purposes, the most important of which includes cooling and lubricating the bit and removing drilled solids, or cuttings, from the borehole. While it is essentially a water based, flowable composition, the drilling mud is frequently compounded with a lubricant material such as diesel, crude oil or other non-water petroleum based constituent to facilitate the mud's lubricating characteristics.

The mud is usually contained in a mud pit, which is connected by way of a mud line and mud pump to a hose and swivel used to inject the mud into the top of the drill pipe. The returning mud, combined with the cuttings, is captured in a mud return pipe and recirculated through the drill pipe.

When the concentration of the drill cuttings in the mud rises too high, recirculation of the mud becomes a problem. In order for the mud to perform its several functions, its viscosity, density and other properties must be maintained within acceptable limits. The drill cuttings adversely affect these properties thus reducing the carrying capacity of the mud and damaging the drilling equipment.

To allow for effective recirculation, the mud is usually separated from the cuttings prior to being recycled through the drill string. The cuttings are then disposed of as waste which presents a problem when the lubricating properties of the mud have been enhanced by the addition of hydrocarbons. Because of the hydrocarbons in the cuttings a hazardous waste problem is presented. Upon completion of the use of the mud in the well, the mud itself becomes waste which must be remediated for the same reasons. Historically, the contaminated cuttings and muds were diluted by mixing, and hauled to remote sites for disposal in landfills. This, however, also presents a problem in that the landfill then becomes a "hazardous" waste site leaving the dumper liable for environmental damages indefinitely.

Decontaminating the materials is more attractive. Treatment processes heretofore available to remove oil or other hydrocarbons from cuttings and mud include distillation, solvent washing, and mud burning. While these processes are effective to varying degrees at stripping the hydrocarbon contaminants from cuttings and mud particulates and rendering them environmentally clean, the processes remain problematic in that of disposal of the liquid or vapor from the disassociated contaminant.

There are several patents on rotary kilns specifically designed to remove volatile hydrocarbons from solid material such as soil. See for example U.S. Pat. Nos. 5,152,233; 5,199,354; 5,302,118, and 5,378,059. All of the rotary kilns are gas fired with the hot combustion gases being directed into the drum to heat the solids. When the solids have a substantial quantity of hydrocarbonaceous material an explosion hazard may be present. In addition, when the flame is applied directly to the contaminated materials, the solids are burned so that the contaminants are consumed and turned into smoke.

One feature of the present invention is to provide an apparatus to remove volatile contaminants from solids, such as cuttings removed from drilling mud, to render environmentally safe and disposable solids while recovering and recycling the disassociated hydrocarbons.

Another feature of the invention is that the volatile hydrocarbons are isolated from the fired heating elements to prevent an explosion hazard and the rotary kiln is sealed so as to prevent oxygen from reaching the heated volatile materials. Other features of the present invention include a kiln in which the solids are maintained in a particulate state and dust is controlled.

SUMMARY OF THE INVENTION

The apparatus of the present invention is essentially a unit which is a rotating drum preferably mounted on a trailer and through which contaminated soil, such as drilling cuttings, is heated and processed to remove and reclaim the contaminants. The contaminant is typically diesel oil which has been added to drilling muds. The soil which exits the unit is essentially contaminant free, and the diesel oil, water and other volatile materials which have been vaporized during the heating process are condensed and collected.

The contaminated soil enters the unit through a hopper and is then propelled by means of an auger into the heated, rotating drum. Heat is applied to the outside of the rotating drum by means of two gas burners mounted on the bottom of the trailer. The flames, therefore, do not come in direct contact with the soil, with the heat being applied to the soil indirectly by conduction through the drum wall. For the treatment process of wellbore cuttings or muds the soil temperatures must be in the 500–900° F. range.

The burners are mounted in separate fireboxes aligned in tandem with the drum axis and are located far enough from the drum so that the flame does not impinge upon the drum. The drum is heated by radiation from the burner flames as well as from convection of air heated by the burner flames. Rotation of the drum prevents the burners from locally overheating the drum.

A stationary shroud, or heat jacket, encompasses the rotating drum and burners. Soil movement through the drum is regulated by drum rotation and inclination and feed rate. The drum is tilted slightly toward the exit end by lowering that end of the trailer. The arrangements of internal flights and chains in the drum are important factors in the efficient flow of material through the drum.

Decontaminated soil exits the lower end of the drum through a double door arrangement which reduces the amount of dust exiting and prevents air from entering the drum. A dust shroud encloses the double door exit end of the drum.

The oil vapors inside the drum are drawn out by applying a slight vacuum to the feed end of the drum. The withdrawn vapors are then sent to a condensing unit and collected. An important feature of the unit for this operation is an air tight seal between the rotating drum and the stationary vent housing around the feed auger. This seal must allow for some axial movement of the drum due to expansion and contraction from heating as angular misalignment and out-of-roundness, and must be able to withstand temperatures in the range of 700° F.

On each end of the drum are steel "tires" which bear on trunnion rollers mounted on the trailer and provide means for drum rotation. Thrust rollers are incorporated into the trunnion assembly on the feed end and bear on the edges of the tire to prevent the drum from moving axially. Drum overall length changes about 3.5 inches during the heat up and cool down cycles, resulting in very large loads being applied to the thrust rollers. The steel tires are mounted to the drum on thin spacer plates allowing air circulation between the tires and drum. This is necessary to prevent excessive head conduction to the trunnion rollers which would greatly reduce the life of the roller bearings.

BRIEF DESCRIPTION OF THE DRAWING

FIG. 4 is an elevational view of the rotary drum in cross section showing the internal arrangement of the flights and chains.

FIG. 5 is a detail of the attachment of the internal chains.

FIG. 6 is a detail of the attachment of the long flights to the inside of the drum.

DETAILED DESCRIPTION OF THE PREFERRED EMBODIMENT

For a detailed description of the preferred embodiment the reader is directed to the accompanying FIGS.

Figure 1:
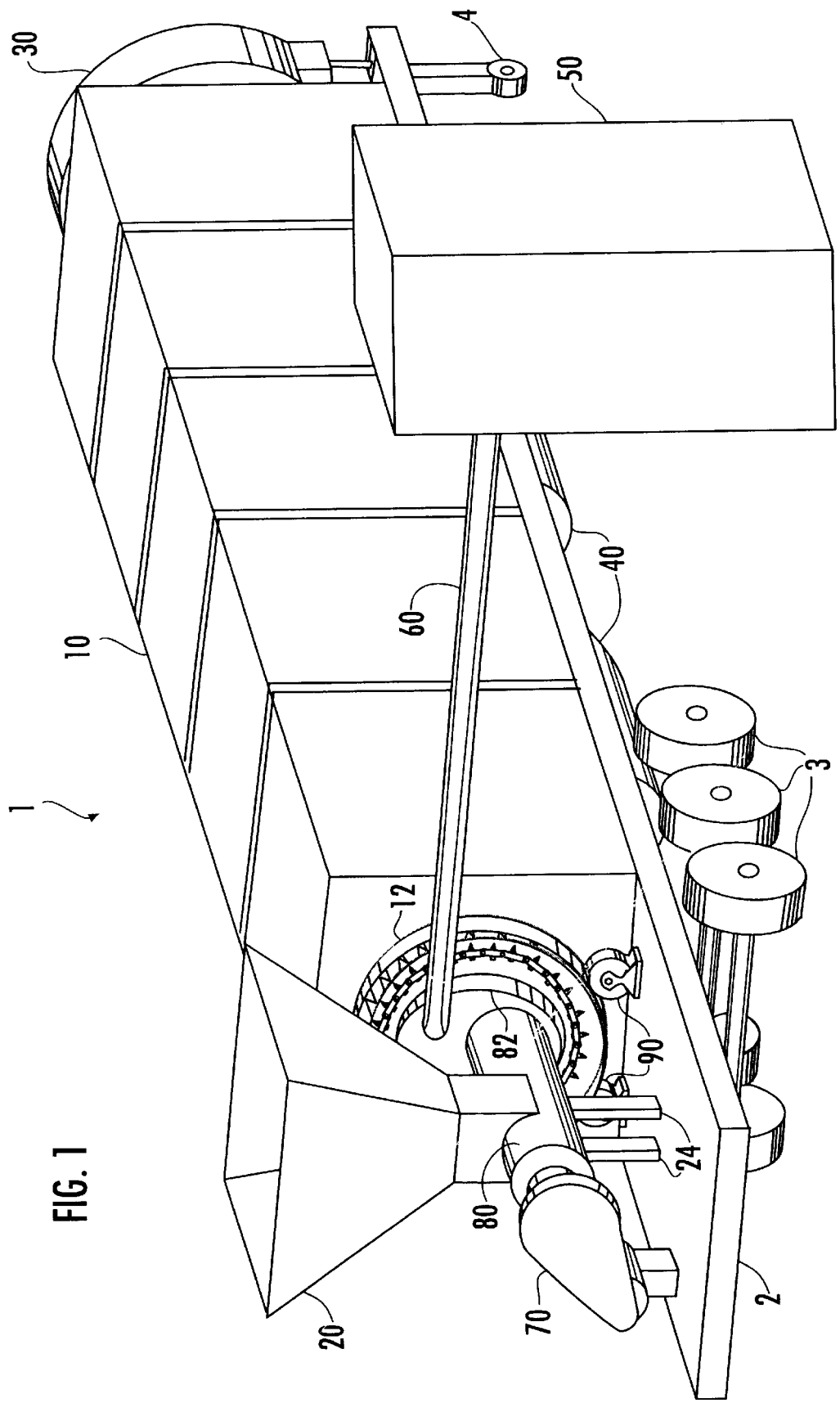
FIG. 1 is an overall isometric view of a preferred embodiment of the recovery apparatus as mounted on a trailer.

In FIG. 1 there is shown an overall isometric view of a preferred embodiment of the recovery apparatus generally indicated as 1 as mounted on a trailer 2. The trailer is portable by the wheels 3 and is supported at the opposite end by smaller wheels 4.

A stationary shroud 10 surrounds the rotary drum 12 the end of which may barely be seen. A feed hopper 20 is provided at the feed end. An auger housing 80 surrounds an auger (not shown in FIG. 1) and passes through an auger entry housing 82 and into the drum. A drive housing 70 for the auger is included at the feed end which surrounds a chain drive driving the auger. The hopper 20 and auger housing 80 are supported by legs 24 on the trailer bed 2. A vapor outlet 60 carries the removed volatile matter to a recovery system 50. The rotary drum 12 is shown supported on the trailer bed 2 by rollers 90.

On the bottom of the stationary shroud 10 are shown the fire boxes 40. At the unloading end a dust shroud 30 surrounds the rotary drum.

Figure 2:
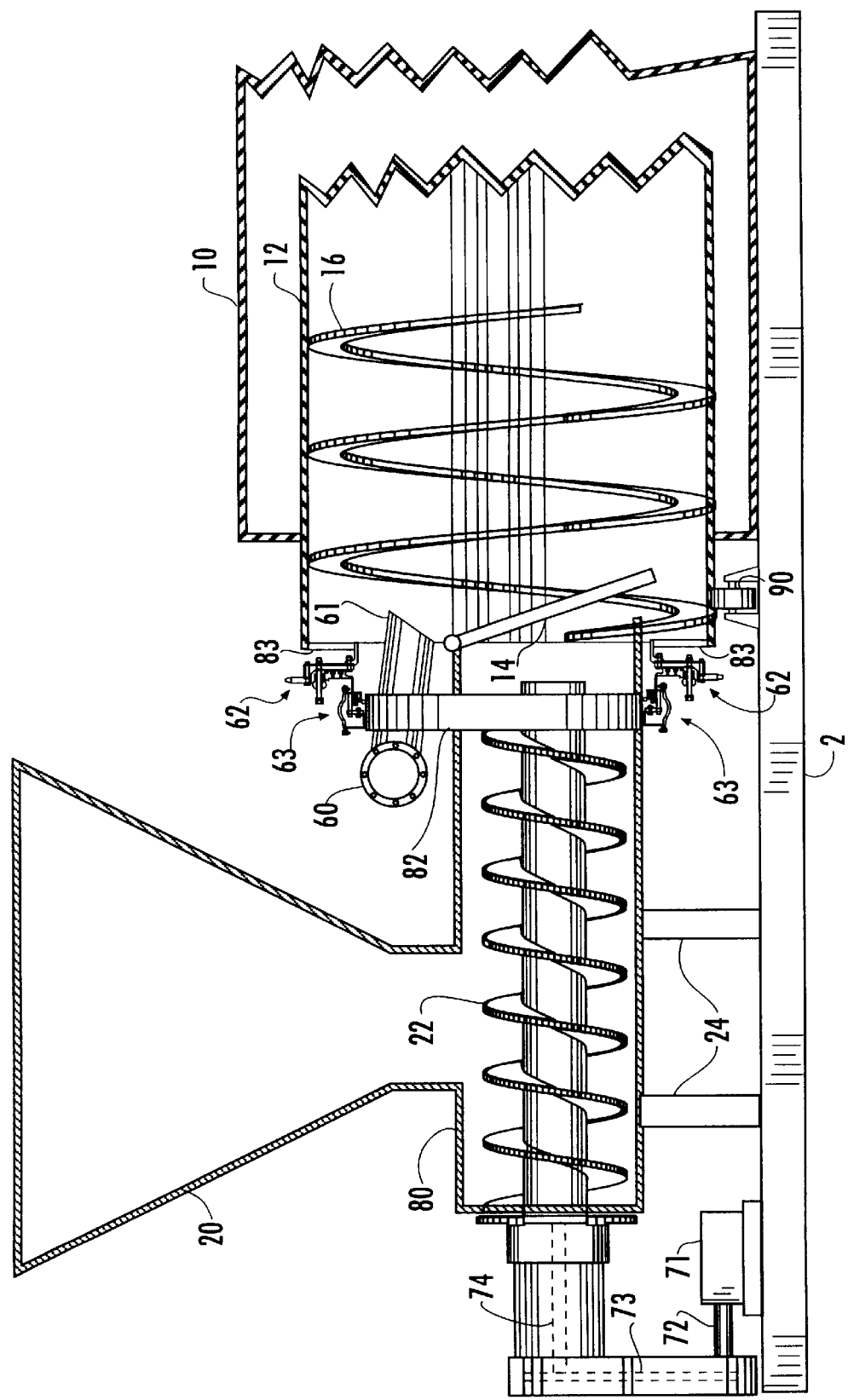
FIG. 2 is a side elevational view in partial cross section showing the loading arrangement.

Referring now to FIG. 2 details of the loading end are shown. The auger 22 is shown enclosed by the housing 80 which receives the contaminated solids directly from the hopper 20. The auger 22 is driven by motor 71 through shaft 72 and chain 73 to auger shaft 74. Again, the hopper and auger housing are shown supported on the trailer bed 2 by legs 24. As shown the auger housing 80 passes through the auger entry housing 82. At the internal end of the auger housing is a door 14 that is biased closed by its own weight. Directly inside the drum 12, shown surrounded by the stationary shroud 10, is a spiral flight 16 which acts similar to an auger (not to be confused with the feed auger) to prevent material from piling up as it enters the drum.

The rotary drum 12 is shown to have an internal extending flange 83 defining an annular surface at the loading end. A circular seal mechanism 62 seals the drum to the auger entry housing 82. A bellows seal 63 allows for axial movement of the auger entry housing 82 in relation to the seal mechanism 62. The drum 12 is shown supported on the trailer bed 2 by the roller 90. The vapor outlet 60 is connected to a conduit 61 which extends into the drum 12.

Figure 3:
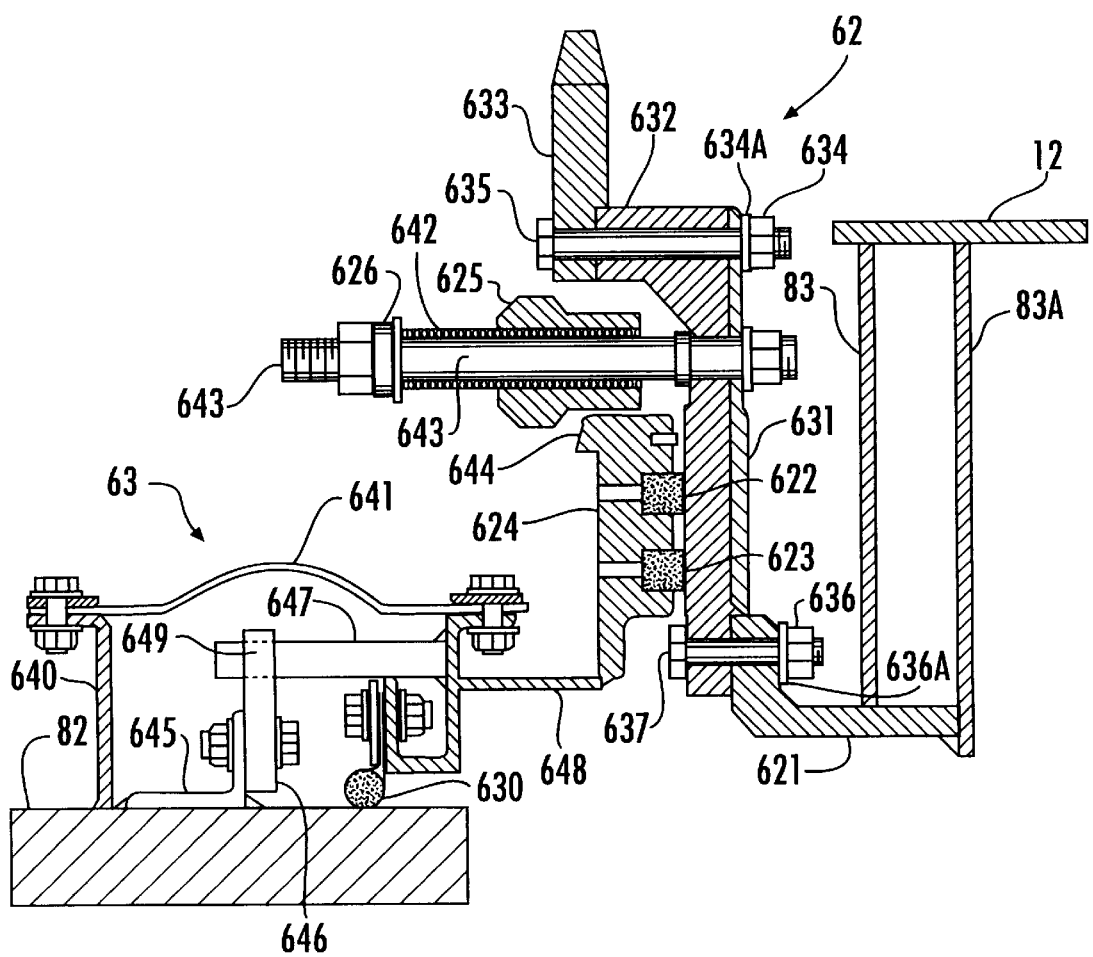
FIG. 3 is a detail of the drum seal assembly at the loading in partial cross section.

Referring now to FIG. 3 greater detail of the drum seal assembly 62 and bellows seal 63 is shown. The view is of the top of the mechanism and it will be apparent that the mechanisms 62 and 63 extend continuously around the drum 12 and auger entry housing 82.

The drum 12 has dual flanges 83 and 83a extending inward to make a dual flange arrangement to support the seal mechanism 62. The seal mechanism is shown to be attached to the dual flanges 83 and 83a by a lower leg 621 the dual flanges acting as stiffening support. An upright member 632 is connected to the leg 621 by bolt 637 and nut 636 and washer 636a. Sprocket 633 for chain drive (not shown) is shown connected to upright member 632 by bolt 635, nut 634 and washer 634a. Backing member 631 is also held in place by the retaining bolts and nuts described above.

Circular graphited carbon seals 622 and 623 are shown to be square in cross section and are held in place by seal retainer 624 which is connected to the bellows assembly and sealed against the auger entry housing 82 by ring packing 630 (comprising a fiberglass rope in a fiberglass sleeve). Flange 640 extends outward from auger entry housing 82 and supports the rubber bellows 641.

A tight seal between the upright member 632 and graphited carbon seals 622 and 623 is provided by bracket tensioner 625 and spring 642 about bolt 643. Spring tension is adjusted by tightening or loosening nut 626 on bolt 643. Bracket tensioner 625 is forced against lip 644 on retainer 624 which presses the graphited carbon seals 622, 623 against the upright member 632.

Bracket 648 is welded to seal retainer 624 and extends toward the flange 640. In order to guide the movement of the seal retainer 624 with the expansion and contraction of the drum, arm 647 extends through a slot 649 in guide 646 which is bolted to bracket 645 which is welded onto auger entry housing 82. This arrangement is repeated at spaced intervals around the bellows seal 63.

Referring now to FIGS. 4–6 the internals of the rotary drum 12 are shown. The spiral flight 16 is shown at the loading end. A series of chains 13 are attached to the internal wall. The chains overlap slightly lengthwise but not circumferentially and are mounted on a longitudinal slope of ½inch per foot of length L2. The lack of circumferential overlap is necessary to prevent them from entangling with each other, while the slope helps propel the material towards the exit end of the drum. The total length of the drum covered by the chains is such that when the material reaches the end of this coverage it is sufficiently dry so as to no longer tend to stick to the internal wall of the drum. Preventing material from sticking to the internal wall is important to the apparatus because this material would form a layer of insulation and block adequate heat transfer to the remaining material.

The attachment 5 of the chains to the internal wall is shown in FIG. 5. Short legs 133 and 134 extend outward from the wall. A bolt 131 is passed through the chain 13 and secured by nut 132.

Further toward the exit end of the drum 12 is a series of flights 18 constructed of steel angle to keep the material agitated and moving. The flights are all mounted on a ½inch per foot slope L1 to help move the material. The flights are all mounted to the internal wall in a special way as shown in FIG. 6. Studs 181 are first welded to the internal wall of the drum. The flights 18 are then secured to the studs 181 with nuts 182 which are just snugged down hand tight. The nuts 182 are then tack welded to the studs 181 as at 183. The flights have elongated longitudinal holes which allow for considerable differential expansion between them and the drum 12. If the flights were welded directly to the internal wall, the welds would rapidly fail due to thermal cycling.

Figure 7:
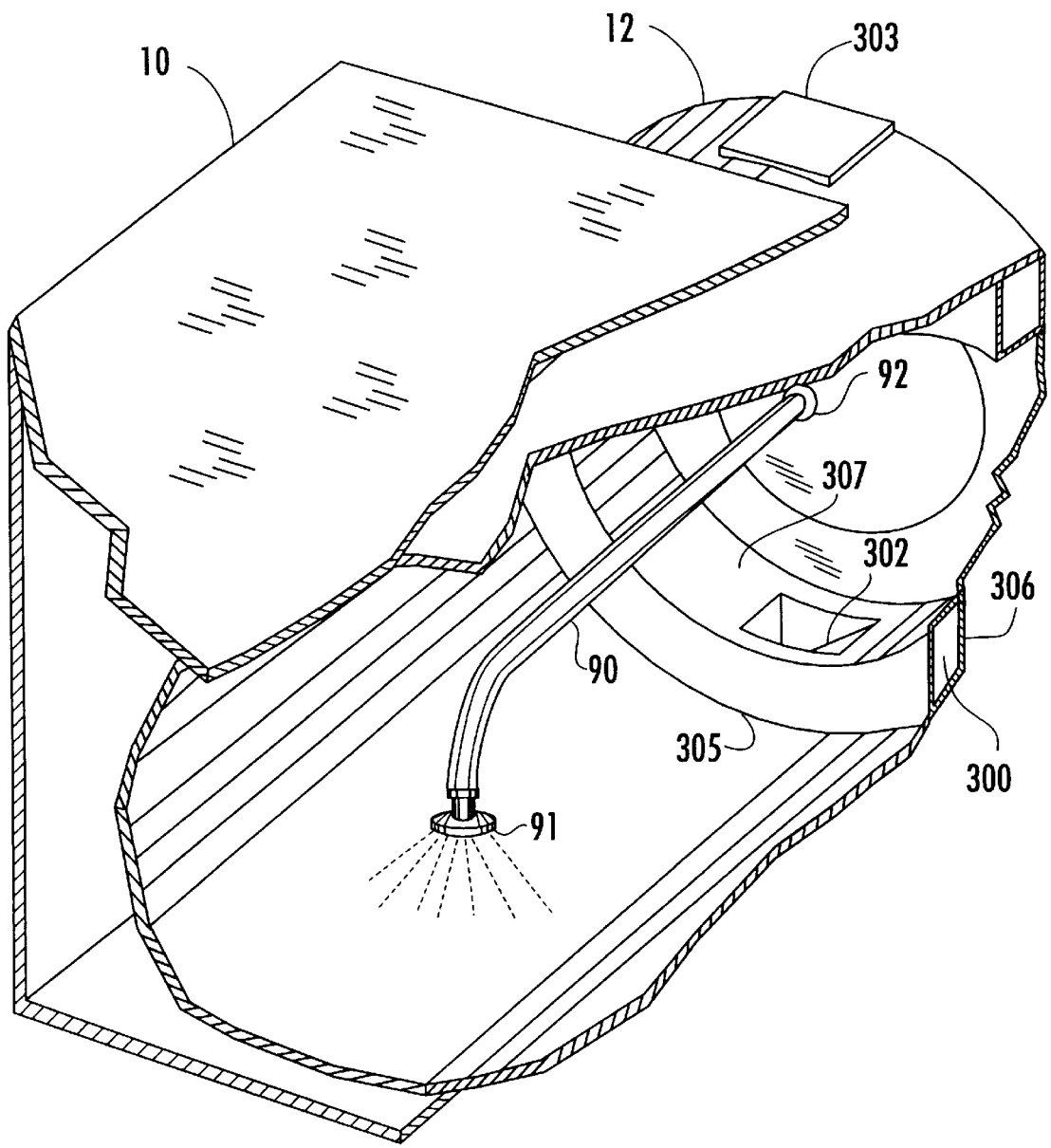
FIG. 7 is an isometric view of the exit end of unit as viewed from the loading end.
Figure 8:
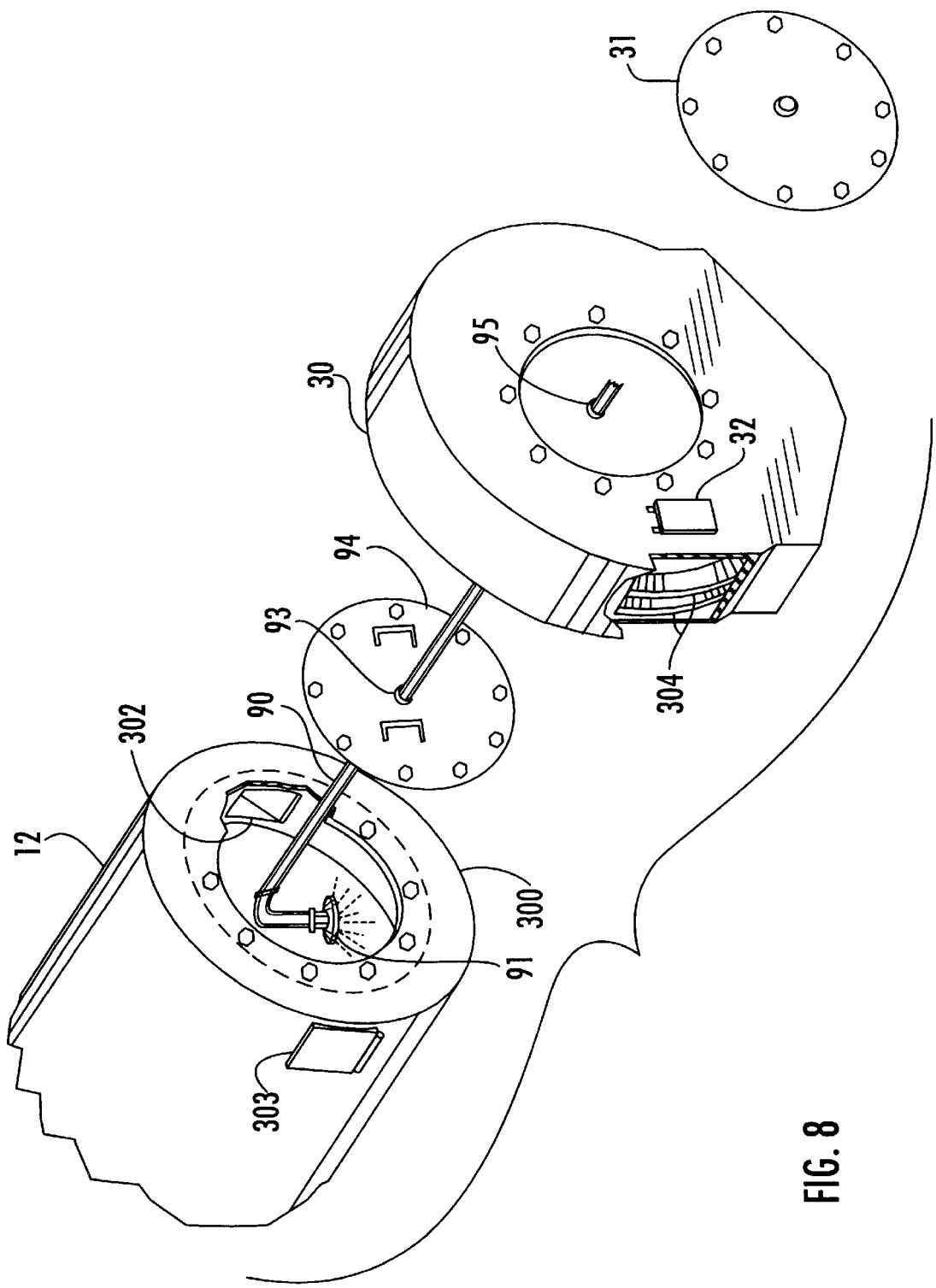
FIG. 8 is an isometric view in partial cross section of the exit end of the rotary drum and dust shroud looking toward the loading end.
Figure 9:
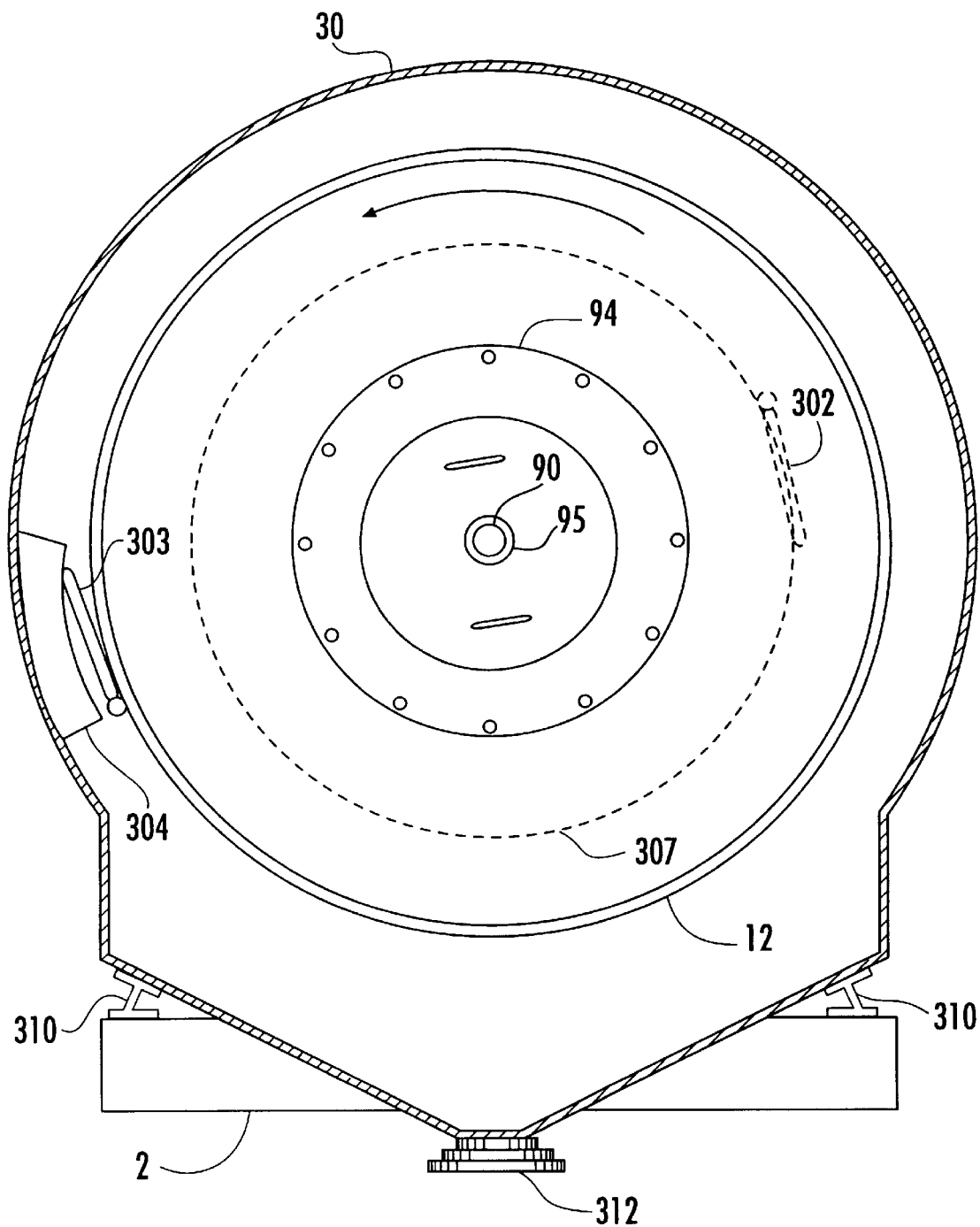
FIG. 9 is an end view of the rotary drum showing the operation of the exit doors.

The discharge end of the rotary drum is seen in FIGS. 7–9. In FIG. 7 the drum 12 is shown surrounded by the stationary shroud 10. An air lock is formed by two inwardly extending baffles 305 and 306 connected by a ring 307. The material enters the air lock chamber 300 via entry door 302 which is in the open position when at the bottom of its route of travel in a rotation of the drum. The discharge door 303 is at 180° to the entry door and is closed by gravity when the entry door is open. As the drum rotates the entry door closes by gravity and the discharge door is prevented from opening prematurely by rails 304 on the inside of the dust shroud 30 which surround the discharge end of the drum as shown in FIG. 9. The dust shroud 30 is supported on the trailer by pedestal 310. The solids discharge 312 is shown in the shroud 30 at the lower end. The arrow on FIG. 9 shows the direction of rotation for the specific embodiment in the figures.

In FIG. 8 the discharge end of the drum is shown in an exploded view. The drum 12 is sealed at its discharge end by plate 94 which is bolted by bolts, nuts and washers (not shown). The dust shroud 30 is similarly closed by plate 31. Extending through the center of both plate 31 and plate 94 and through metal seals 95 and 93, respectively, is pipe 95, which extends into the interior of drum 12 and ends with a spray head 91. The pipe 90 is stationary. Water may be sprayed through the pipe onto the detoxified soil in the drum to reduce dust. An observation port covered by flap 32 is located on the back surface of the shroud adjacent to the rails 304.

Figure 10:
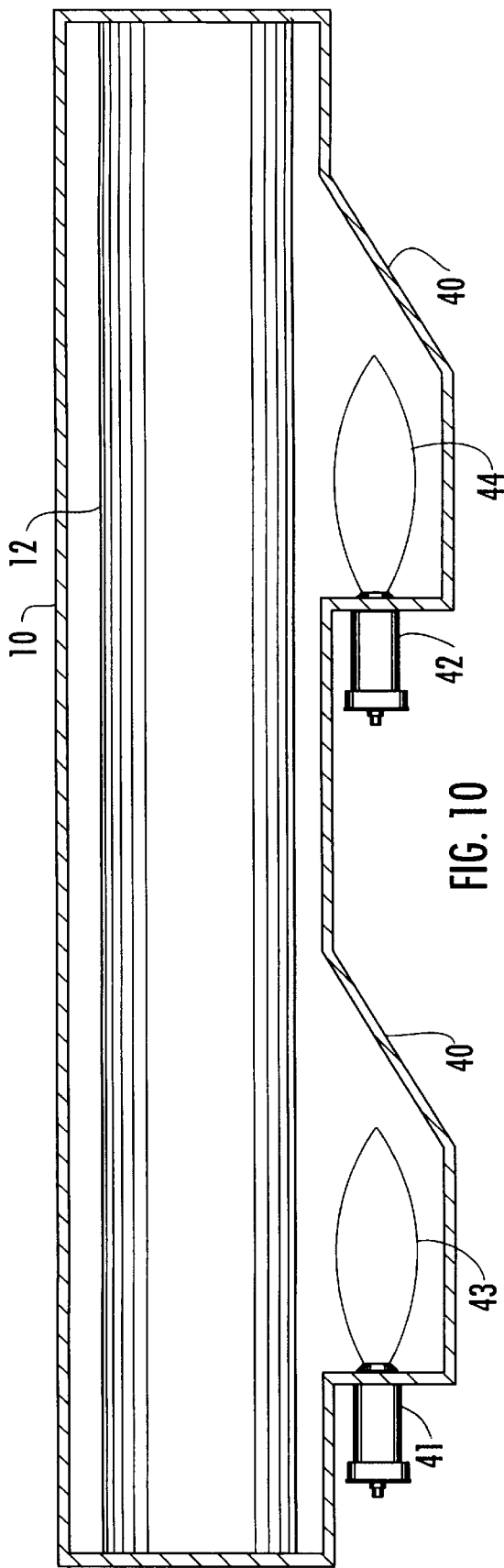
FIG. 10 is a side elevational in partial cross section of the drum, stationary shroud and fire box.
Figure 11:
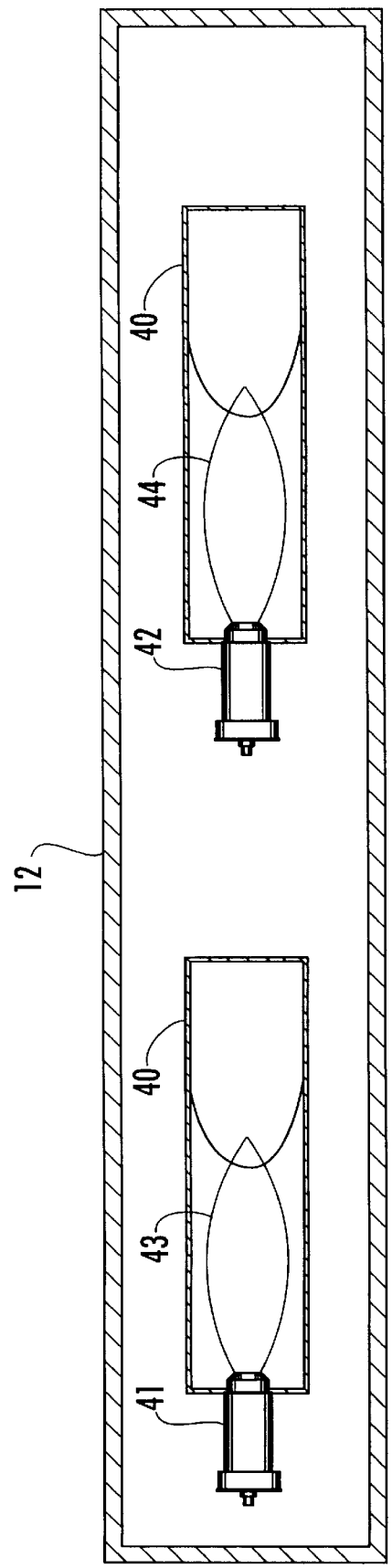
FIG. 11 is a bottom elevational view showing the arrangement of the burners in relation to the drum.

Finally there is shown in FIGS. 10 and 11 the fire box arrangement. The fire boxes 40 contain two burners 41 and 42. The burners are arranged in the box such that the flames 43 and 44 do not impinge the drum 12 but rather heat the air inside the stationary shroud 10 around the drum 12. This prevents overheating of the material and local overheating in the drum.

The invention claimed is:

1. An apparatus for removing and recovering volatile material from solids comprising:

(a) a rotating drum having a solids feed end and a solids exit end;

(b) a fire box mounted adjacent to said rotating drum; (c) a solid feed entry attached to said solids feed end;

(d) a vapor exit conduit secured to said rotating drum at said solid feed end through said solid feed entry;

(e) an airtight seal between said rotating drum and said solid feed entry; and (f) a plurality of chains secured longitudinally along the internal surface of said drum.

2. The apparatus of claim 1 wherein said solid feed entry comprises;

a hopper attached to said solids feed end;

an auger housing attached to said hopper;

a door in auger housing adjacent said rotating drum and opening into said rotating drum and normally biased closed; and an auger mounted in said auger housing perpendicular to said door.

3. The apparatus of claim 2 wherein said solids feed end comprises an annular surface extending inward of said rotating drum defining a circular opening therein.

4. The apparatus of claim 3 wherein said air tight seal comprises:

(A) an auger entry housing and annular bellows seal mounted thereabout, a circular seal retainer having at least one annular seal in a first surface proximal to said drum, a collar connecting said seal retainer to said bellows, said collar having at least one guide slidably mounted in a cooperating guide member which is mounted on said auger entry housing;

(B) an annular structure connected to said drum and toward said seal retainer to cooperatively contact said annular seal, and (C) at least one upright member attached to said annular structure and extending past said seal retainer, at least one bracket tensioner slidably mounted on said post, said bracket tensioner having a surface to engage a second surface of said seal retainer and a spring biasing said bracket tensioner toward said seal retainer to bring said seal into engagement with said annular structure.

5. The apparatus of claim 4 wherein said air tight seal element is axially movable in relation to said rotating drum.

6. The apparatus of claim 5 wherein said vapor exit conduit comprises a conduit through said one side and said circular opening.

7. The apparatus of claim 1 wherein said firebox is arranged adjacent to said rotating drum so that flames generated therein do not impinge upon said rotating drum but extend along the longitudinal axis of said rotating drum.

8. The apparatus of claim 7 further comprising a shroud completely around said rotating drum and said firebox.

9. The apparatus of claim 1 where in said solids exit end comprises a circumferential air lock about the inside of said drum with a first door allowing solids entry into said air lock from said drum and a second door allowing solids to exit from said air lock.

10. The apparatus of claim 9 wherein said first and second doors are disposed 180° apart around the circumference of said air lock.

11. The apparatus of claim 1 further comprising a spiral flight on the internal surface of said drum at said solids feed end.

12. The apparatus according to claim 1 wherein said chains overlap longitudinally but do not overlap circumferentially.

13. The apparatus according to claim 1 further comprising a plurality of straight flights on the interior surface of said rotating drum near said solids exit end.

14. The apparatus of claim 13 further comprising studs on the internal surface of said drum and said straight flights are held on said studs by nuts which are hand tightened and then tack welded in place.

15. The apparatus according to claim 1 further comprising a water conduit extending longitudinally into said drum proximal to the solids exit end.

16. The apparatus according to claim 15 wherein said water conduit is stationary.

17. An apparatus for removing and recovering volatile material from solids comprising:
    (a) a rotating drum having a solids feed end and a solids exit end, said drum comprising
        (i) a spiral flight on the internal surface of said. drum at said solids feed end,
        (ii) a plurality of straight flights near said solids exit end, and
        (iii) a plurality of chains secured longitudinally along the internal surface of said drum;
    (b) a fire box mounted adjacent to said rotating drum so that flames generated therein do no impinge upon said rotating drum but extend along the longitudinal axis of said rotating drum;
    (c) a solid feed means attached to said solids feed end, said feed means comprising
        (i) a hopper attached to said solids feed end,
        (ii) an auger housing attached to said hopper,
        (iii) a door in said auger housing adjacent, said rotating drum and opening into said rotating drum and normally biased closed, and
        (iv) an auger mounted in said hopper perpendicular to said door;
    (d) a vapor exit means secured to said rotating drum at said solid feed end through said solid feed means; and
    (e) an airtight seal between said rotating drum and said solid feed means.

18. The apparatus according to claim 17 mounted on a trailer.

19. An air tight seal for sealing a rotating drum to an entry housing comprising:
    (A) an entry housing and annular bellows seal mounted thereabout, a circular seal retainer having at least one annular seal in a first surface proximal to said drum, a collar connecting said seal retainer to said bellows, said collar having at least one guide slidably mounted in a cooperating guide member which is mounted on said entry housing;
    (B) an annular structure connected to said drum and toward said seal retainer to cooperatively contact said annular seal, and
    (C) at least one upright member attached to said annular structure and extending past said seal retainer, at least one bracket tensioner slidably mounted on said post, said bracket tensioner having a surface to engage a second surface of said seal retainer and a spring biasing said bracket tensioner toward said seal retainer to bring said seal into engagement with said annular structure.

20. An apparatus for removing and recovering volatile material from solids comprising:
    (a) a rotating drum having a solids feed end and a solids exit end;
    (b) a fire box mounted adjacent to said rotating drum said firebox being arranged adjacent to said rotating drum so that flames generated therein do not impinge upon said rotating drum but extend along the longitudinal axis of said rotating drum;
    (c) a solid feed entry attached to said solids feed end;
    (d) a vapor exit conduit secured to said rotating drum at said solid feed end through said solid feed entry;
    (e) an airtight seal between said rotating drum and said solid feed entry; and
    (f) a shroud completely around said rotating drum and said firebox.

21. The apparatus of claim 20 wherein said solid feed entry comprises;
    a hopper attached to said solids feed end;
    an auger housing attached to said hopper;
    a door in auger housing adjacent said rotating drum and opening into said rotating drum and normally biased closed; and
    an auger mounted in said auger housing perpendicular to said door.

22. The apparatus of claim 21 wherein said solids feed end comprises an annular surface extending inward of said rotating drum defining a circular opening therein.

23. The apparatus of claim 22 wherein said air tight seal comprises:
    (A) an auger entry housing and annular bellows seal mounted thereabout, a circular seal retainer having at least one annular seal in a first surface proximal to said drum, a collar connecting said seal retainer to said bellows, said collar having at least one guide slidably mounted in a cooperating guide member which is mounted on said auger entry housing;
    (B) an annular structure connected to said drum and toward said seal retainer to cooperatively contact said annular seal, and
    (C) at least one upright member attached to said annular structure and extending past said seal retainer, at least one bracket tensioner slidably mounted on said post, said bracket tensioner having a surface to engage a second surface of said seal retainer and a spring biasing said bracket tensioner toward said seal retainer to bring said seal into engagement with said annular structure.

24. The apparatus of claim 23 wherein said air tight seal element is axially movable in relation to said rotating drum.

25. The apparatus of claim 24 wherein said vapor exit conduit comprises a conduit through said one side and said circular opening.

26. The apparatus of claim 20 wherein said solids exit end comprises a circumferential air lock about the inside of said drum with a first door allowing solids entry into said air lock from said drum and a second door allowing solids to exit from said air lock.

27. The apparatus of claim 26 wherein said first and second doors are disposed 180° apart around the circumference of said air lock.

28. The apparatus of claim 20 further comprising a spiral flight on the internal surface of said drum at said solids feed end.

29. The apparatus of claim 20 further comprising a plurality of chains secured longitudinally along the internal surface of said drum.

30. The apparatus according to claim 29 wherein said chains overlap longitudinally but do not overlap circumferentially.

31. The apparatus according to claim 20 further comprising a plurality of straight flights on the interior surface of said rotating drum near said solids exit end.

32. The apparatus of claim 31 further comprising studs on the internal surface of said drum and said straight flights are held on said studs by nuts which are hand tightened and then tack welded in place.

33. The apparatus according to claim 20 further comprising a water conduit extending longitudinally into said drum proximal to the solids exit end.

34. The apparatus according to claim 33 wherein said water conduit is stationary.

35. An apparatus for removing and recovering volatile material from solids comprising:
 (a) a rotating drum having a solids feed end and a solids exit end;
 (b) a fire box mounted adjacent to said rotating drum;
 (c) a solid feed entry attached to said solids feed end;
 (d) a vapor exit conduit secured to said rotating drum at said solid feed end through said solid feed entry;
 (e) an airtight seal between said rotating drum and said solid feed entry;
said solids exit end comprising a circumferential air lock about the inside of said drum with a first door allowing solids entry into said air lock from said drum and a second door disposed 180° circumferentially from said first door allowing solids to exit from said air lock.

36. The apparatus of claim 35 wherein said solid feed entry comprises;
 a hopper attached to said solids feed end;
 an auger housing attached to said hopper;
 a door in auger housing adjacent said rotating drum and opening into said rotating drum and normally biased closed; and
 an auger mounted in said auger housing perpendicular to said door.

37. The apparatus of claim 36 wherein said solids feed end comprises an annular surface extending inward of said rotating drum defining a circular opening therein.

38. The apparatus of claim 37 wherein said air tight seal comprises:
 (A) an auger entry housing and annular bellows seal mounted thereabout, a circular seal retainer having at least one annular seal in a first surface proximal to said drum, a collar connecting said seal retainer to said bellows, said collar having at least one guide slidably mounted in a cooperating guide member which is mounted on said auger entry housing;
 (B) an annular structure connected to said drum and toward said seal retainer to cooperatively contact said annular seal, and
 (C) at least one upright member attached to said annular structure and extending past said seal retainer, at least one bracket tensioner slidably mounted on said post, said bracket tensioner having a surface to engage a second surface of said seal retainer and a spring biasing said bracket tensioner toward said seal retainer to bring said seal into engagement with said annular structure.

39. The apparatus of claim 38 wherein said air tight seal element is axially movable in relation to said rotating drum.

40. The apparatus of claim 39 wherein said vapor exit conduit comprises a conduit through said one side and said circular opening.

41. The apparatus of claim 35 wherein said firebox is arranged adjacent to said rotating drum so that flames generated therein do not impinge upon said rotating drum but extend along the longitudinal axis of said rotating drum.

42. The apparatus of claim 41 further comprising a shroud completely around said rotating drum and said firebox.

43. The apparatus of claim 35 further comprising a spiral flight on the internal surface of said drum at said solids feed end.

44. The apparatus of claim 35 further comprising a plurality of chains secured longitudinally along the internal surface of said drum.

45. The apparatus according to claim 44 wherein said chains overlap longitudinally but do not overlap circumferentially.

46. The apparatus according to claim 35 further comprising a plurality of straight flights on the interior surface of said rotating drum near said solids exit end.

47. The apparatus of claim 46 further comprising studs on the internal surface of said drum and said straight flights are held on said studs by nuts which are hand tightened and then tack welded in place.

48. The apparatus according to claim 35 further comprising a water conduit extending longitudinally into said drum proximal to the solids exit end.

49. The apparatus according to claim 48 wherein said water conduit is stationary.

50. An apparatus for removing and recovering volatile material from solids comprising:
 (a) a rotating drum having a solids feed end and a solids exit end;
 (b) a fire box mounted adjacent to said rotating drum;
 (c) a solid feed entry attached to said solids feed end;
 (d) a vapor exit conduit secured to said rotating drum at said solid feed end through said solid feed entry;
 (e) an airtight seal between said rotating drum and said solid feed entry; and
 a water conduit extending longitudinally into said drum proximal to the solids exit end.

51. The apparatus of claim 50 wherein said solid feed entry comprises;
 a hopper attached to said solids feed end;
 an auger housing attached to said hopper;
 a door in auger housing adjacent said rotating drum and opening into said rotating drum and normally biased closed; and
 an auger mounted in said auger housing perpendicular to said door.

52. The apparatus of claim 51 wherein said solids feed end comprises an annular surface extending inward of said rotating drum defining a circular opening therein.

53. The apparatus of claim 52 wherein said air tight seal comprises:
 (A) an auger entry housing and annular bellows seal mounted thereabout, a circular seal retainer having at least one annular seal in a first surface proximal to said drum, a collar connecting said seal retainer to said bellows, said collar having at least one guide slidably mounted in a cooperating guide member which is mounted on said auger entry housing;

(B) an annular structure connected to said drum and toward said seal retainer to cooperatively contact said annular seal, and (C) at least one upright member attached to said annular structure and extending past said seal retainer, at least one bracket tensioner slidably mounted on said post, said bracket tensioner having a surface to engage a second surface of said seal retainer and a spring biasing said bracket tensioner toward said seal retainer to bring said seal into engagement with said annular structure.

54. The apparatus of claim 53 wherein said air tight seal element is axially movable in relation to said rotating drum.

55. The apparatus of claim 54 wherein said vapor exit conduit comprises a conduit through said one side and said circular opening.

56. The apparatus of claim 50 wherein said firebox is arranged adjacent to said rotating drum so that flames generated therein do not impinge upon said rotating drum but extend along the longitudinal axis of said rotating drum.

57. The apparatus of claim 56 further comprising a shroud completely around said rotating drum and said firebox.

58. The apparatus of claim 50 wherein said solids exit end comprises a circumferential air lock about the inside of said drum with a first door allowing solids entry into said air lock from said drum and a second door allowing solids to exit from said air lock.

59. The apparatus of claim 58 wherein said first and second doors are disposed 180° apart around the circumference of said air lock.

60. The apparatus of claim 50 further comprising a spiral flight on the internal surface of said drum at said solids feed end.

61. The apparatus of claim 51 further comprising a plurality of chains secured longitudinally along the internal surface of said drum.

62. The apparatus according to claim 61 wherein said chains overlap longitudinally but do not overlap circumferentially.

63. The apparatus according to claim 50 further comprising a plurality of straight flights on the interior surface of said rotating drum near said solids exit end.

64. The apparatus of claim 63 further comprising studs on the internal surface of said drum and said straight flights are held on said studs by nuts which are hand tightened and then tack welded in place.

65. The apparatus according to claim 50 wherein said water conduit is stationary.

66. An apparatus for removing and recovering volatile material from solids comprising:

(a) a rotating drum having a solids feed end and a solids exit end;

(b) a fire box mounted adjacent to said rotating drum;

(c) a solid feed entry attached to said solids feed end;

(d) a vapor exit conduit secured to said rotating drum at said solid feed end through said solid feed entry;

(e) an airtight seal between said rotating drum and said solid feed entry; and (f) a plurality of chains secured longitudinally along the internal surface of said drum;

said airtight seal comprising:

(A) an entry housing and annular bellows seal mounted thereabout, a circular seal retainer having at least one annular seal in a first surface proximal to said drum, a collar connecting said seal retainer to said bellows, said collar having at least one guide slidably mounted in a cooperating guide member which is mounted on said entry housing;

(B) an annular structure connected to said drum and toward said seal retainer to cooperatively contact said annular seal, and (C) at least one upright member attached to said annular structure and extending past said seal retainer, at least one bracket tensioner slidably mounted on said post, said bracket tensioner having a surface to engage a second surface of said seal retainer and a spring biasing said bracket tensioner toward said seal retainer to bring said seal into engagement with said annular structure.

* * * * *